United States Patent
Toda

(10) Patent No.: US 6,564,649 B1
(45) Date of Patent: May 20, 2003

(54) ULTRASONIC DOPPLER FLOW-METER

(76) Inventor: Kohji Toda, 1-49-18 Futaba, Yokosuka 239-0814 (JP)

( * ) Notice: Subject to any disclaimer, the term of this patent is extended or adjusted under 35 U.S.C. 154(b) by 0 days.

(21) Appl. No.: 09/392,546

(22) Filed: Sep. 9, 1999

(51) Int. Cl.$^7$ ................................................ G01E 1/66
(52) U.S. Cl. ..................................................... 73/861.26
(58) Field of Search ................. 73/861.26; 367/861.25; 310/313 R, 313 B

(56) References Cited

U.S. PATENT DOCUMENTS

| | | | |
|---|---|---|---|
| 5,287,035 A | * 2/1994 | Carroll et al. | 257/415 |
| 5,372,221 A | * 12/1994 | Jalbert | 188/1.11 |
| 5,432,393 A | * 7/1995 | Davenport | 310/313 B |
| 5,575,289 A | * 11/1996 | Skidmore | 600/454 |
| 5,633,809 A | * 5/1997 | Wissenbach et al. | 364/510 |
| 5,771,206 A | * 6/1998 | Toda | 310/313 R |
| 6,142,948 A | * 11/2000 | Toda | 600/459 |
| 6,317,389 B1 | * 11/2001 | Toda | 367/164 |
| 6,393,920 B1 | * 5/2002 | Toda | 310/324 |

* cited by examiner

Primary Examiner—Hezron Williams
Assistant Examiner—Lilybett Martir

(57) ABSTRACT

An ultrasonic Doppler flow-meter comprises a substrate with a piezoelectricity, input- and output interdigital transducers formed on a first end surface of the substrate, and a signal analyzing unit connected between the input- and output interdigital transducers. A second end surface of the substrate is in contact with a liquid. The finger direction the output interdigital transducer is slanting to that of the input interdigital transducer. When an input electric signal with a carrier frequency $f_0$ is applied to the input interdigital transducer, a leaky Lamb wave is excited in the substrate. The leaky Lamb wave is radiated into the liquid in the form of a longitudinal wave, which is reflected back by a material in the liquid. The reflected longitudinal wave is detected at the output interdigital transducer as a delayed electric signal with a Doppler frequency f. A moving speed of the material is sensed at the signal analyzing unit in terms of a frequency difference $\Delta f$ between the carrier frequency $f_0$ and the Doppler frequency f.

5 Claims, 16 Drawing Sheets

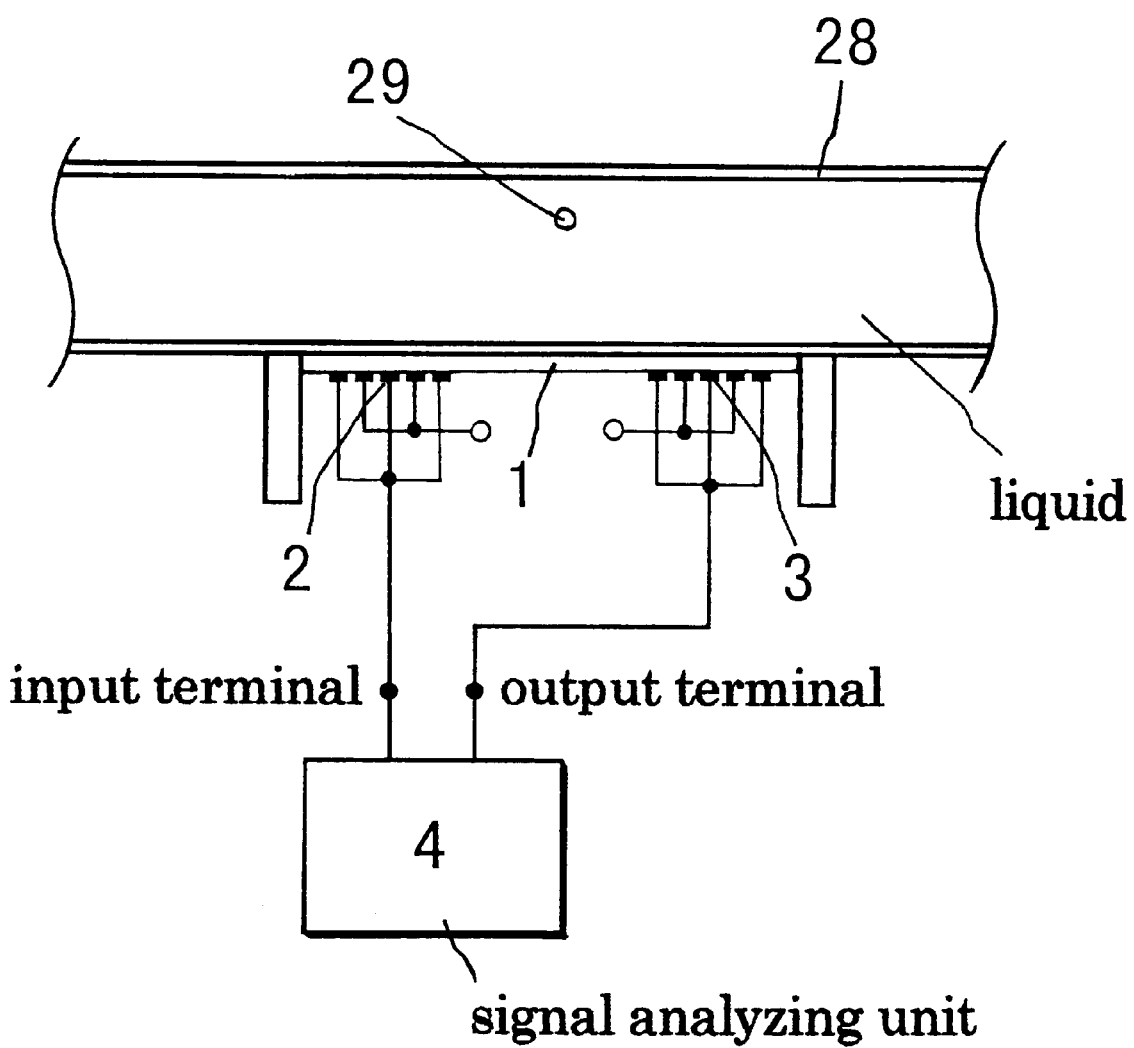

ULTRASONIC DOPPLER FLOW-METER

BACKGROUND OF THE INVENTION

1. Field of the Invention

The present invention relates to an ultrasonic device for measuring a flowing speed of a liquid or a material's moving speed in a liquid by making use of the Doppler effect.

2. Description of the Prior Art

There are touch- and untouch-types of conventional devices for detecting a vibration displacement. Devices, for example, as an electric micrometer and a digital gauge for a small displacement, a rotary encoder for a rotation displacement, and a linear scale for a large displacement belong to the touch-type. These touch-type devices have some problems on measurement accuracy, response time, difficulty in use, durability and manufacturing. Devices, for example, as a laser-type sensor and an electroacoustic-type sensor belong to the untouch-type. The laser-type sensor has a defect that the longer the length of the laser beam, the lower the measurement accuracy because of flickering of the laser beam itself. In addition, the use of the laser-type sensor is impossible for the measurement in opaque media. The electroacoustic-type sensor has some problems on measurement accuracy, resistance for a change of circumstances, and so on. In addition, it is difficult to measure precisely and conveniently a flowing speed of a liquid by conventional devices.

SUMMARY OF THE INVENTION

An object of the present invention is to provide an ultrasonic Doppler flow-meter capable of measuring a flowing speed of a liquid or a material's moving speed in a liquid with a high sensitivity.

Another object of the present invention is to provide an ultrasonic Doppler flow-meter capable of operating at a high frequency.

Another object of the present invention is to provide an ultrasonic Doppler flow-meter excellent in measurement accuracy, response time, durability, and manufacturing.

A still other object of the present invention is to provide an ultrasonic Doppler flow-meter easy in use and having a small size which is very light in weight and has a simple structure.

According to one aspect of the present invention there is provided an ultrasonic Doppler flow-meter comprising a substrate with a piezoelectricity, an input- and output interdigital transducers formed on a first end surface of the substrate, and signal analyzing unit. The finger direction of the output interdigital transducer is slanting to that of the input interdigital transducer. A second end surface of the substrate is in contact with a liquid. When an input electric signal with a carrier frequency is applied to the input interdigital transducers, a leaky elastic wave if excited in the substrate. The leaky elastic wave is radiated in the form of a longitudinal wave into the liquid, and reflected by a material in the liquid. The reflected longitudinal wave is detected at the output interdigital transducer as a delayed electric signal with a Doppler frequency. The signal analyzing unit senses a moving speed of the material in terms of a frequency difference between the carrier frequency and the Doppler frequency.

According to another aspect of the present invention there is provided a substrate made of a piezoelectric ceramic plate, of which the polarization axis is parallel to the thickness direction thereof.

According to another aspect of the present invention there is provided a substrate made of a double-layer body consisting of a piezoelectric layer part and a nonpiezoelectric layer part. Each layer part has an inner- and an outer end surfaces. The input- and output interdigital transducers are formed on one of the inner- and outer end surfaces of the piezoelectric layer part. The liquid is in contact with the outer end surface of the nonpiezoelectric layer part.

According to another aspect of the present invention there is provided a substrate made of a triple-zone body consisting of a first- and a second piezoelectric zone parts and a nonpiezoelectric zone part between the first- and second piezoelectric zone parts. Each zone part has two end surfaces. The input- and out put interdigital transducers are formed on one end surface of the first piezoelectric zone part and that of the second piezoelectric zone part, respectively. The liquid is in contact with the other end surface of each zone part.

According to another aspect of the present invention there is provided an ultrasonic Doppler flow-meter comprising a nonpiezoelectric plate, a first- and a second piezoelectric substrates, an input- and output interdigital transducers, and signal analyzing unit. One end surface of the nonpiezoelectric plate is in contact with a liquid. The first- and second piezoelectric substrates are formed on the other end surface of the nonpiezoelectric plate under an electrically separated condition. The input interdigital transducer is formed on one end surface of the first piezoelectric substrate. The output interdigital transducer is formed on one end surface of the second piezoelectric substrate, the finger direction of the output interdigital transducer being slanting to that of the input interdigital transducer.

According to another aspect of the present invention there is provided a material rotating itself. In this case, the signal analyzing unit senses a rotating speed of the material.

According to another aspect of the present invention there is provided a material moving in accordance with a flowing speed of the liquid. In this case the signal analyzing unit senses the flowing speed.

According to another aspect of the present invention there is provided an output interdigital transducer, of which the finger direction is vertical to that of an input interdigital transducer.

According to another aspect of the present invention there is provided an input- and an output interdigital transducers having an arch-shaped electrode pattern, respectively, and making a pair with a concentric center.

According to another aspect of the present invention there is provided a signal analyzing unit which comprises a signal generator generating the input electric signal, an amplifier amplifying the delayed electric signal, and a frequency counter detecting the frequency difference.

According to other aspect of the present invention there is provided a signal analyzing unit which comprises a signal generator generating the input electric signal, an amplifier amplifying the delayed electric signal, and a frequency to voltage converter converting the Doppler frequency to a voltage thereof. The frequency to voltage converter detects the frequency difference in terms of the voltage converted from the Doppler frequency.

According to a further aspect of the present invention there is provided a signal analyzing unit which comprises a signal generator generating the input electric signal, and a phase comparator comparing a phase of the input electric signal with that of the delayed electric signal. The phase comparator detects the frequency difference in terms of a phase difference between the input- and delayed electric signals.

BRIEF DESCRIPTION OF THE DRAWINGS

Other features and advantages of the invention will be clarified from the following description with reference to the attached drawings.

FIG. 16 shows an illustration in case of measuring a flowing speed of a liquid in pipe 28 by using the ultrasonic Doppler flow-meter in FIG. 1.

DETAILED DESCRIPTION OF THE PRESENTLY PREFERRED EXEMPLARY EMBODIMENTS

Figure 1:
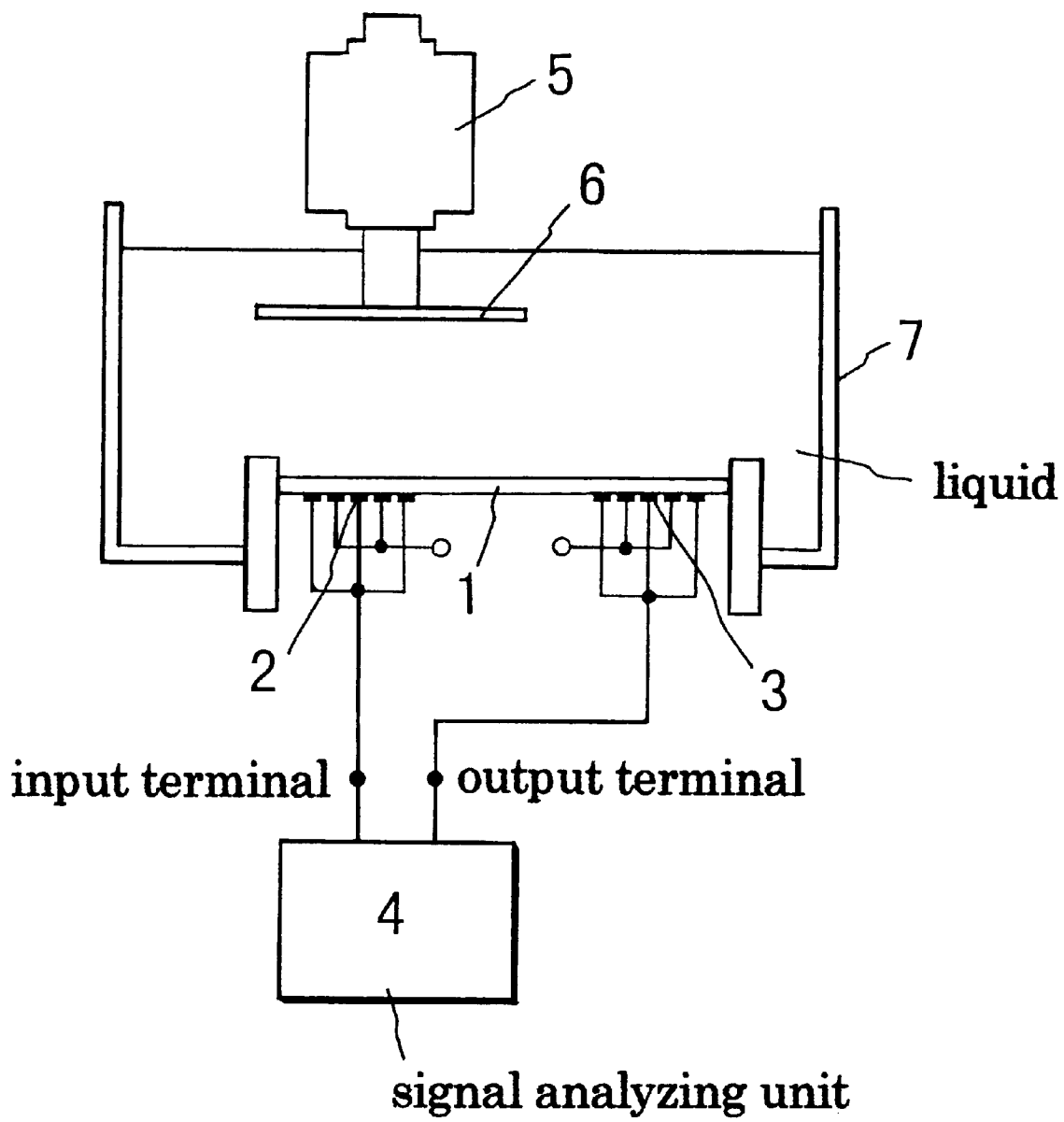
FIG. 1 shows a schematic illustration of an ultrasonic Doppler flow-meter according to an embodiment of the present invention.

FIG. 1 shows a schematic illustration of an ultrasonic Doppler flow-meter according to an embodiment of the present invention. The ultrasonic Doppler flow-meter comprises substrate 1, input interdigital transducer 2 having an input terminal, output interdigital transducer 3 having an output terminal, and signal analyzing unit 4. Piezoelectric substrate 1 is made of a ceramic thin plate with a dimension of 150 μm in thickness. It is possible to use a piezoelectric polymer film as substrate 1. Input interdigital transducer 2 and output interdigital transducer 3, made of an aluminum thin film, respectively, are formed on a first end surface of substrate 1. Piezoelectric substrate 1, input interdigital transducer 2 and output interdigital transducer 3 form a detecting assembly. When sensing a rotating speed of motor 5 having rotating disk 6 in a liquid, a second end surface of substrate 1 is kept in contact with the liquid in liquid bath 7. Thus, the ultrasonic Doppler flow-meter in FIG. 1 has a small size which is very light in weight and has a simple structure. The liquid is water in this embodiment.

Figure 2:
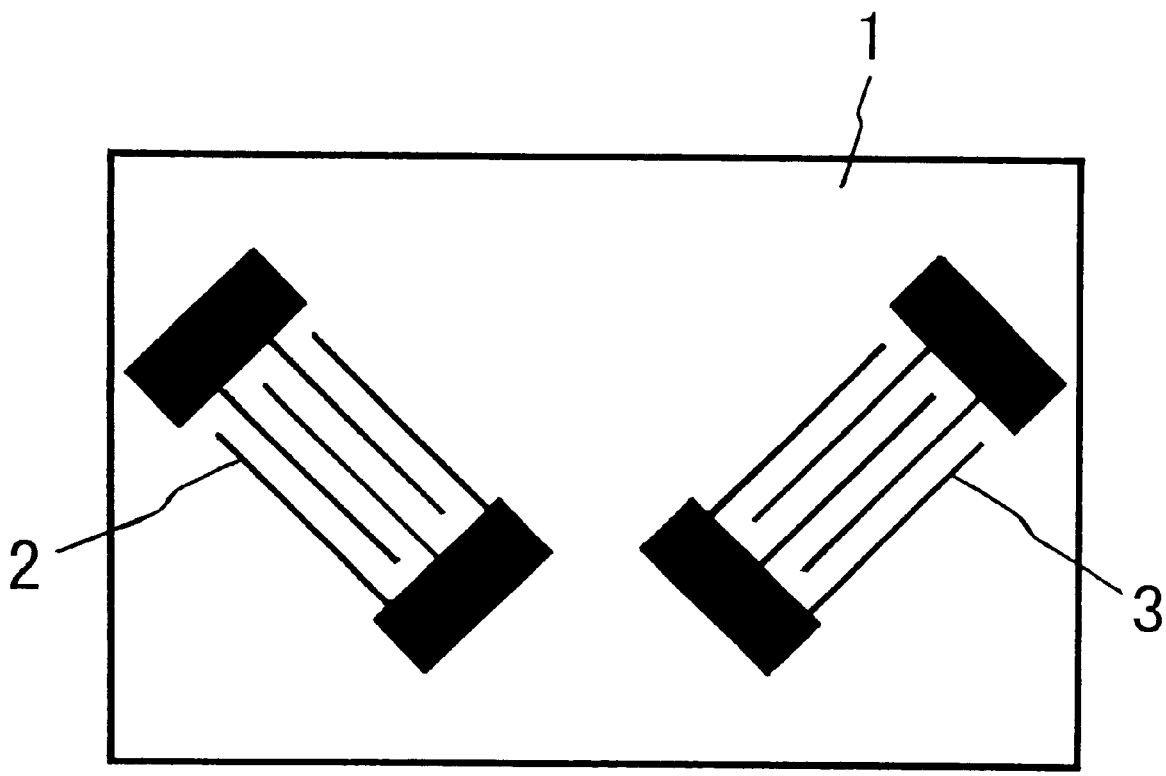
FIG. 2 shows a plan view of the detecting assembly composed of substrate 1, input interdigital transducer 2 and output interdigital transducer 3.

FIG. 2 shows a plan view of the detecting assembly composed of substrate 1, input interdigital transducer 2 and output interdigital transducer 3. Input interdigital transducer 2 and output interdigital transducer 3 have ten electrode-finger pairs, a finger-overlap length of 4 mm and an interdigital periodicity of 340 μm, respectively. The finger direction of output interdigital transducer 8 is vertical to that of input interdigital transducer 2.

Figure 8:
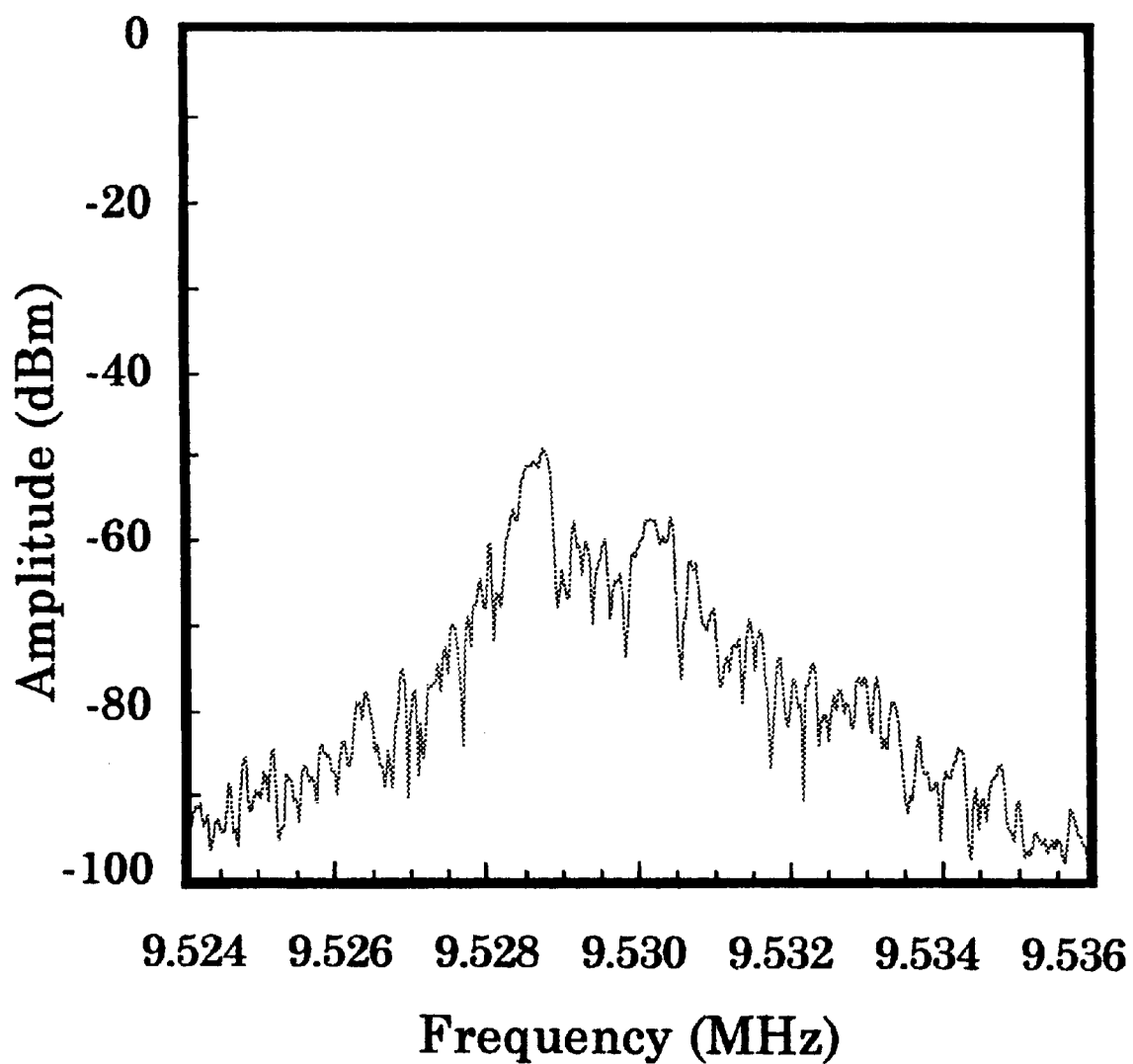
FIG. 8 shows a spectrum relationship between the frequency observed at frequency counter 10 and the amplitude thereof, when disk 6 is rotating.

FIG. 8 shows a diagram of signal analyzing unit 4 according to a first embodiment. Signal analyzing unit 4 comprises signal generator 8, amplifier 9 and frequency counter 10.

Figure 3:
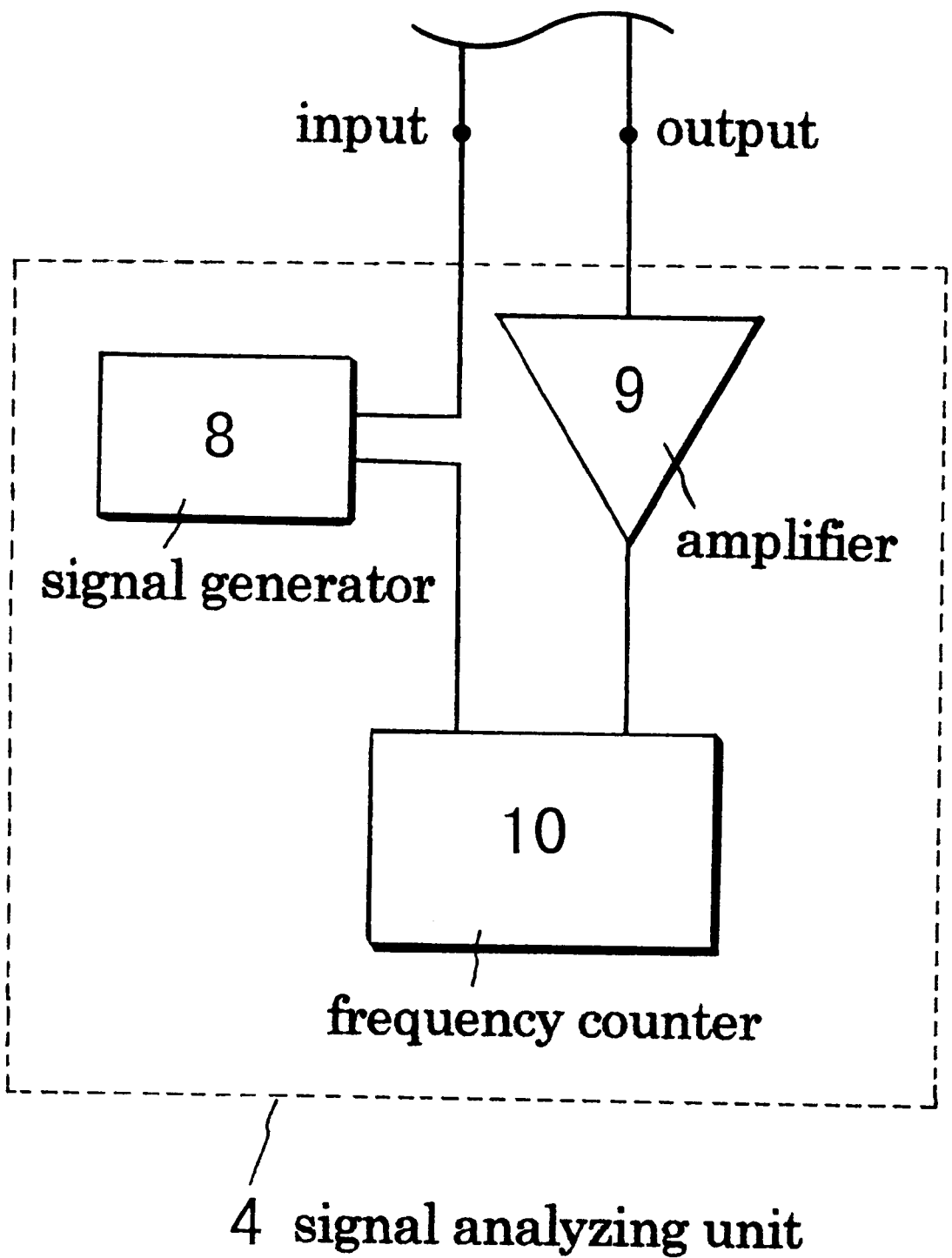
FIG. 3 shows a diagram of signal analyzing unit 4 according to a first embodiment.

In the ultrasonic Doppler flow-meter in FIG. 1 having signal analyzing unit 4 in FIG. 3, if an input electric signal with a carrier frequency $f_0$ approximately corresponding to the interdigital periodicity of input interdigital transducer 2, is applied from signal generator 8 to input interdigital transducer 2, a leaky Lamb wave is excited in substrate 1. Because substrate 1 is made of a piezoelectric ceramic plate, and in addition, the polarization axis thereof is parallel to the thickness direction thereof, the leaky Lamb wave is excited in substrate 1 effectively. The leaky Lamb wave having the wavelength approximately equivalent to the interdigital periodicity is radiated effectively in the form of a longitudinal wave into the liquid, in other words, a mode conversion from the leaky Lamb wave to the longitudinal wave in the liquid occurs. Then, disk 6 reflects the longitudinal wave in the liquid. The reflected longitudinal wave is detected at output interdigital transducer 3 as a delayed electric signal with a Doppler frequency f. The delayed electric signal is amplified via amplifier 9. The amplified electric signal is transmitted to frequency counter 10 counting the Doppler frequency f, which is changed according to a rotation of disk 6. Thus, a rotating speed of motor 5 is detected from a frequency difference Δf between the carrier frequency $f_0$ and the Doppler frequency f.

Figure 4:
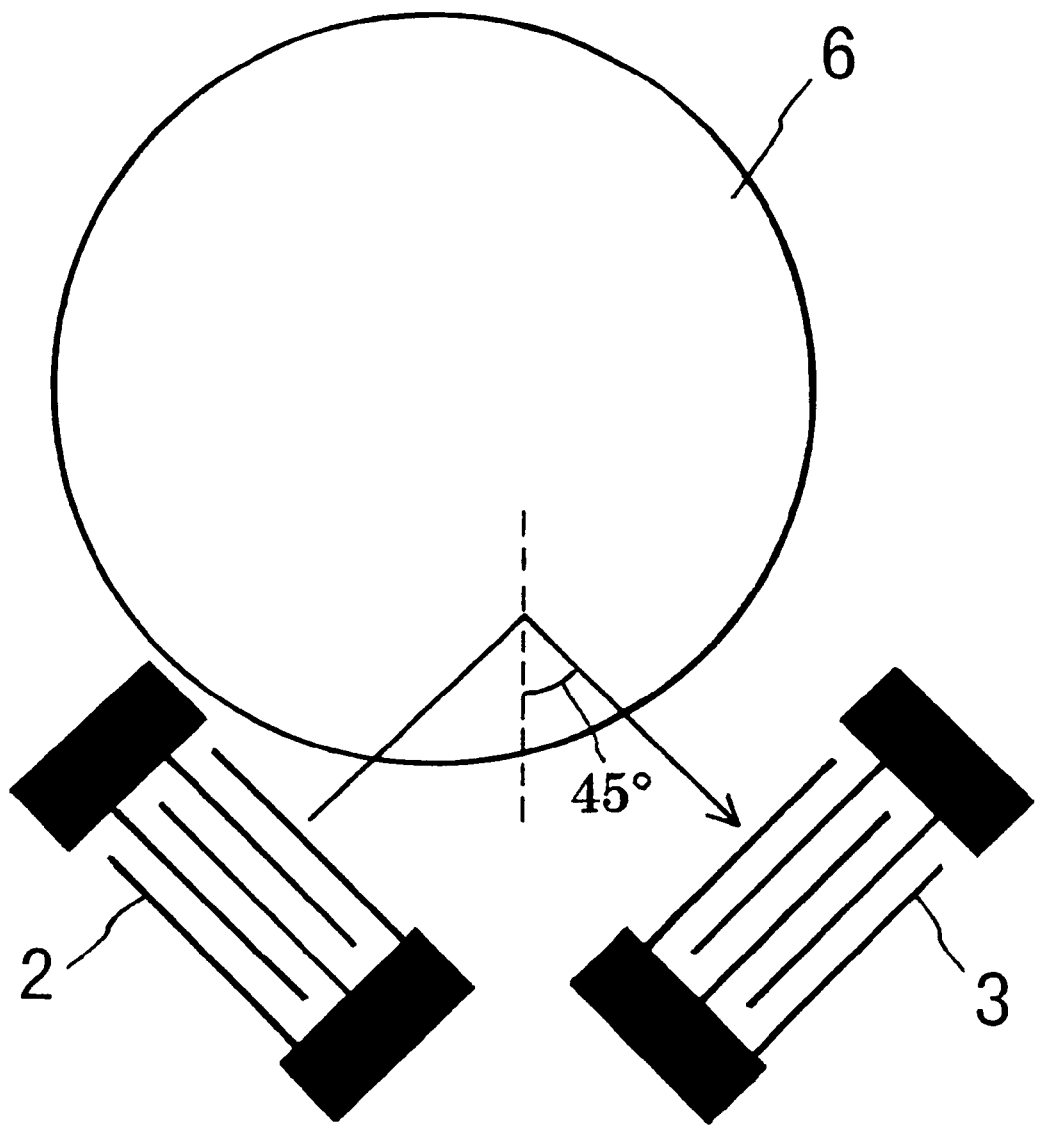
FIG. 4 shows a plan view illustrating a path of the longitudinal wave in the liquid by an arrow.

FIG. 4 shows a plan view illustrating a path of the longitudinal wave in the liquid by an arrow. Disk 6 reflects the longitudinal wave by 45° on a horizontal section.

Figure 5:
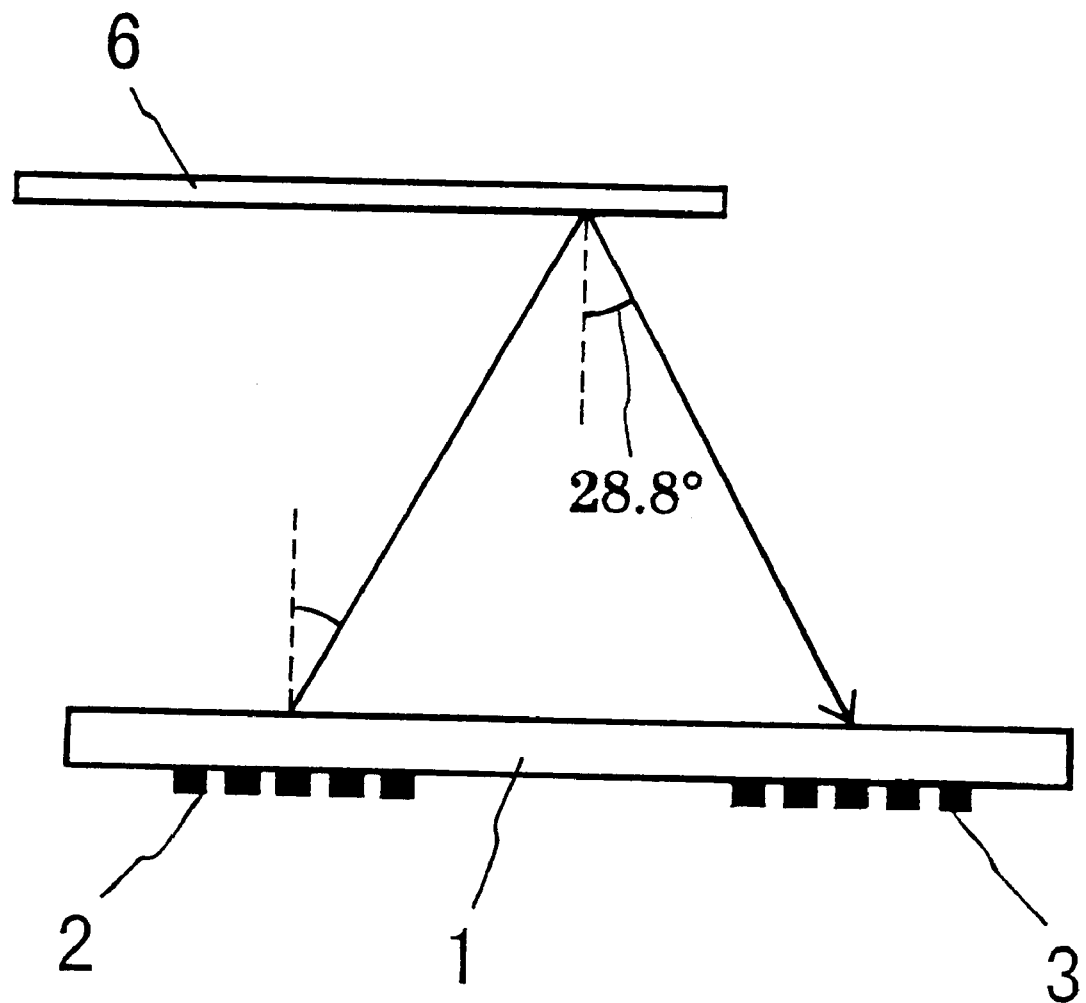
FIG. 5 shows a side view illustrating a path of the longitudinal wave in the liquid by an arrow.

FIG. 5 shows a side view illustrating a path of the longitudinal wave in the liquid by an arrow. Input interdigital transducer 2 radiates the longitudinal wave into water by 28.8°, because that (1) substrate 1 has a dimension of 150 μm in thickness, (2) input interdigital transducer 2 have the interdigital periodicity of 340 μm, and (3) the liquid is water. In other words, a radiation angle of the longitudinal wave is calculated by means of the leaky Lamb wave velocity in substrate 1 and the longitudinal wave velocity in water. As a result, disk 6 reflects the longitudinal wave by 28.8° on a vertical section.

Figure 6:
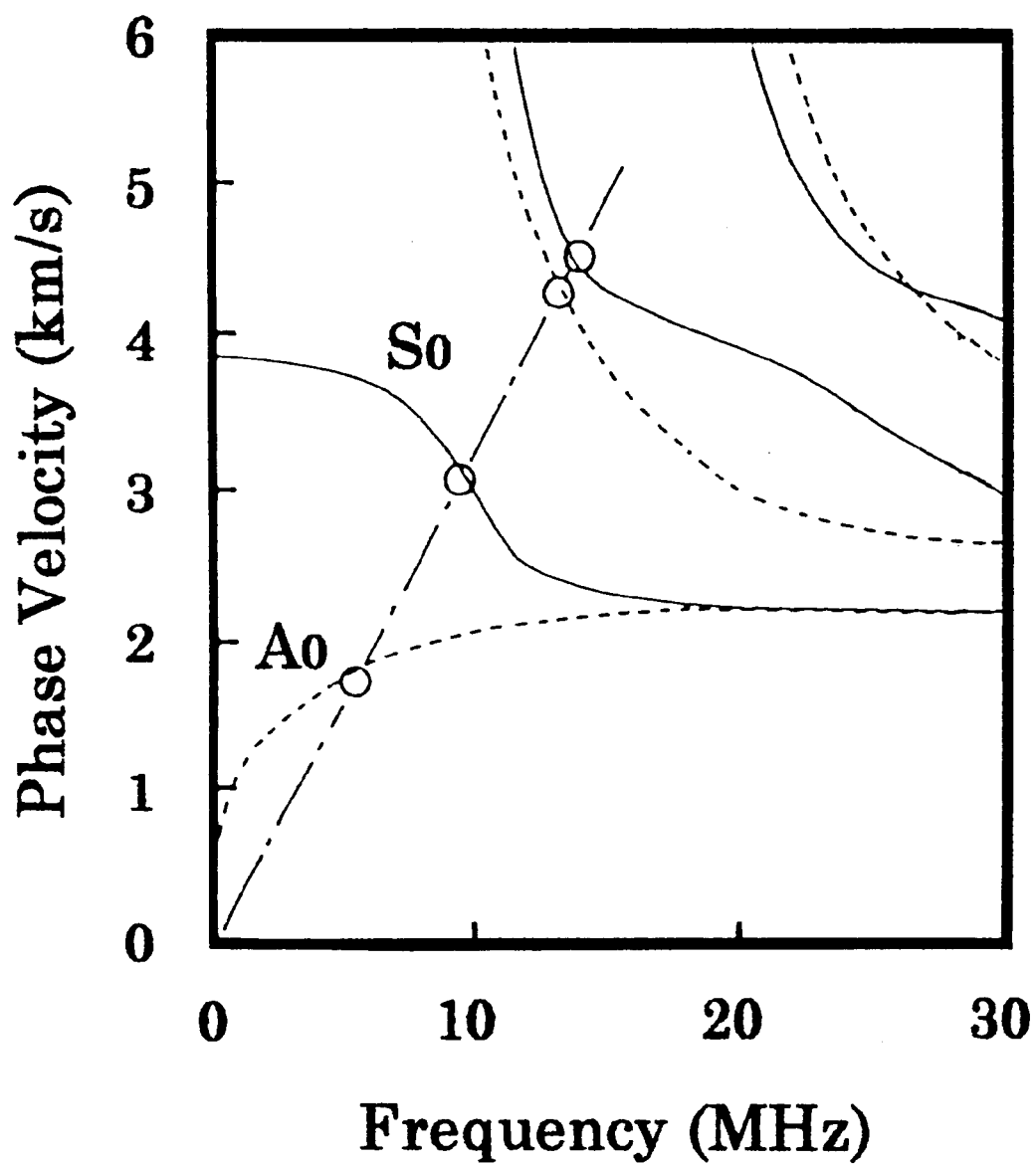
FIG. 6 shows a relationship between the frequency and the calculated phase velocity of a leaky Lamb wave for each mode in substrate 1.

FIG. 6 shows a relationship between the frequency and the calculated phase velocity of a leaky Lamb wave for each mode in substrate 1. Piezoelectric substrate 1 has a shear wave velocity of 2,450 m/s and a longitudinal wave velocity of 4,390 m/s. Each mode has an effective radiation condition of the longitudinal wave into the liquid.

Figure 7:
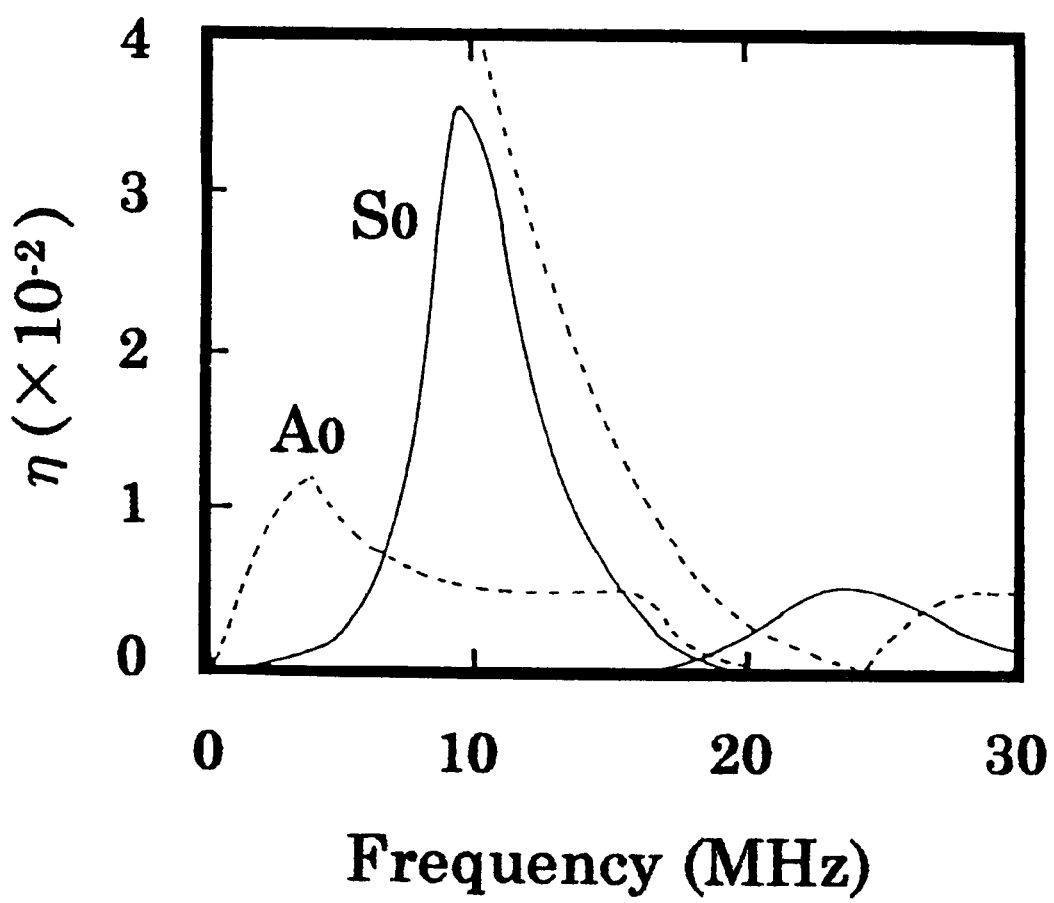
FIG. 7 shows a relationship between the frequency and the calculated transducer efficiency η for a longitudinal wave radiation into water.

FIG. 7 shows a relationship between the frequency and the calculated transducer efficiency η for a longitudinal wave radiation into water. It should be noted that the $S_0$ mode curve has the highest peak at around 9.53 MHz, that is the most appropriate operation frequency.

It is clear from FIGS. 6 and 7 that (1) the $S_0$ mode Lamb wave is most effectively converted to the longitudinal wave in water, (2) the most appropriate operation frequency for the $S_0$ mode Lamb wave is approximately 9.53 MHz, which corresponds to the carrier frequency $f_0$, and (3) the phase velocity at around 9.53 MHz in substrate 1 is approximately 3,090 km/s.

FIG. 8 shows a spectrum relationship between the frequency observed at frequency counter 10 and the amplitude thereof, when disk 6 is rotating. The Doppler spectrum in FIG. 8 has two energy peak frequencies at around 9.5285 MHz and 9.6345 MHz, corresponding to the Doppler frequency f and the carrier frequency $f_0$. Thus, the frequency difference $\Delta f$ is obtained. On the other hand, the Doppler frequency f is calculated from the following equation, $$f = f_0 \frac{V - v \times \cos\alpha \times \sin\beta}{V + v \times \cos\alpha \times \sin\beta},$$

where V is the longitudinal wave velocity in water, v is the rotating speed of motor 5, $\alpha$ is an incident angle of the longitudinal wave to disk 6, and $\beta$ is a radiation angle of the longitudinal wave into water from substrate 1. The Doppler frequency f calculated from the equation is approximately coincident with that observed at frequency counter 10.

Figure 9:
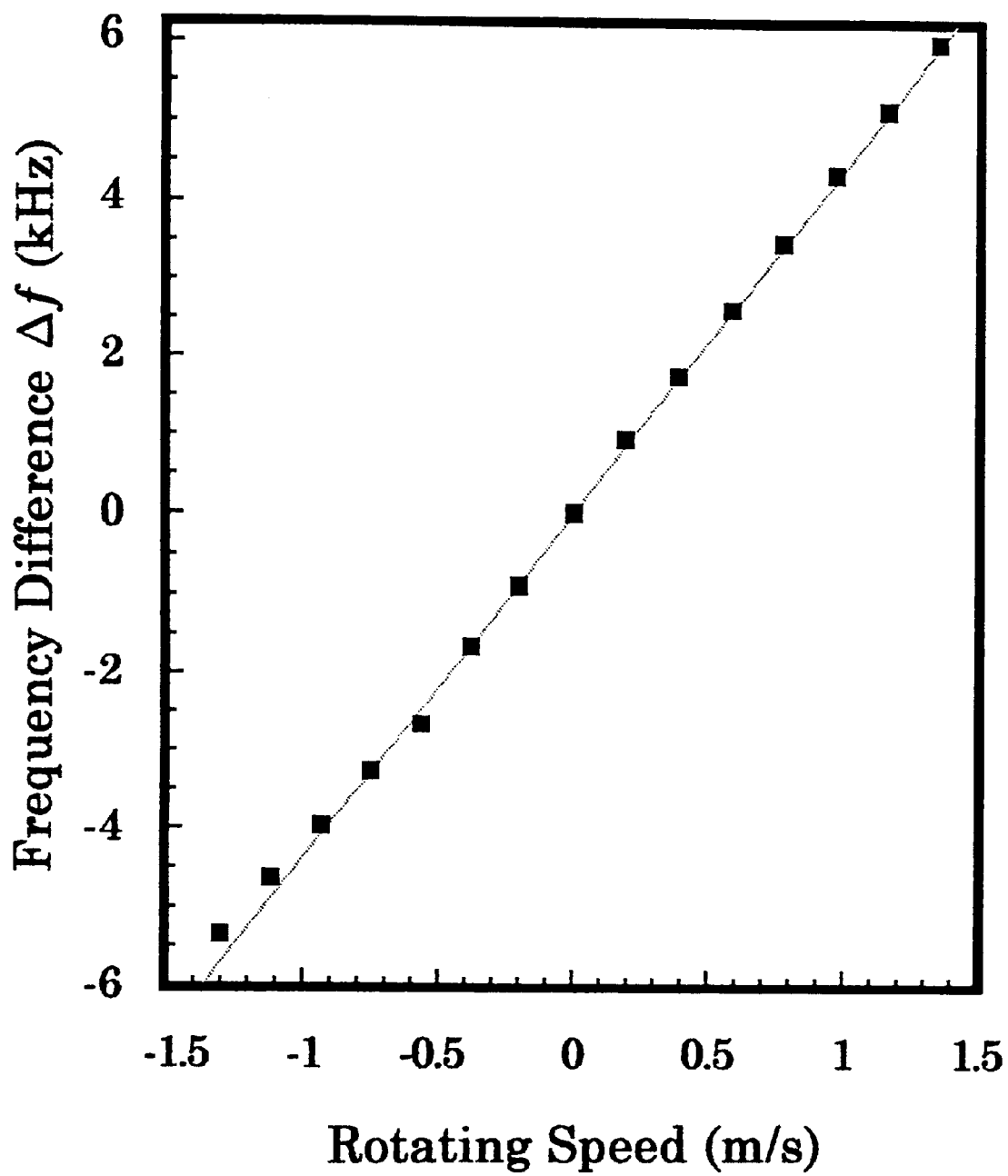
FIG. 9 shows a relationship between the rotating speed of motor 5 and the frequency difference Δf.

FIG. 9 shows a relationship between the rotating speed of motor 5 and the frequency difference $\Delta f$. It is clear that the rotating speed is linearly correlated with the frequency difference $\Delta f$. Thus, the rotating speed is obtained from the frequency difference $\Delta f$. Some minus signs in FIG. 9 mean the reverse rotation.

Figure 10:
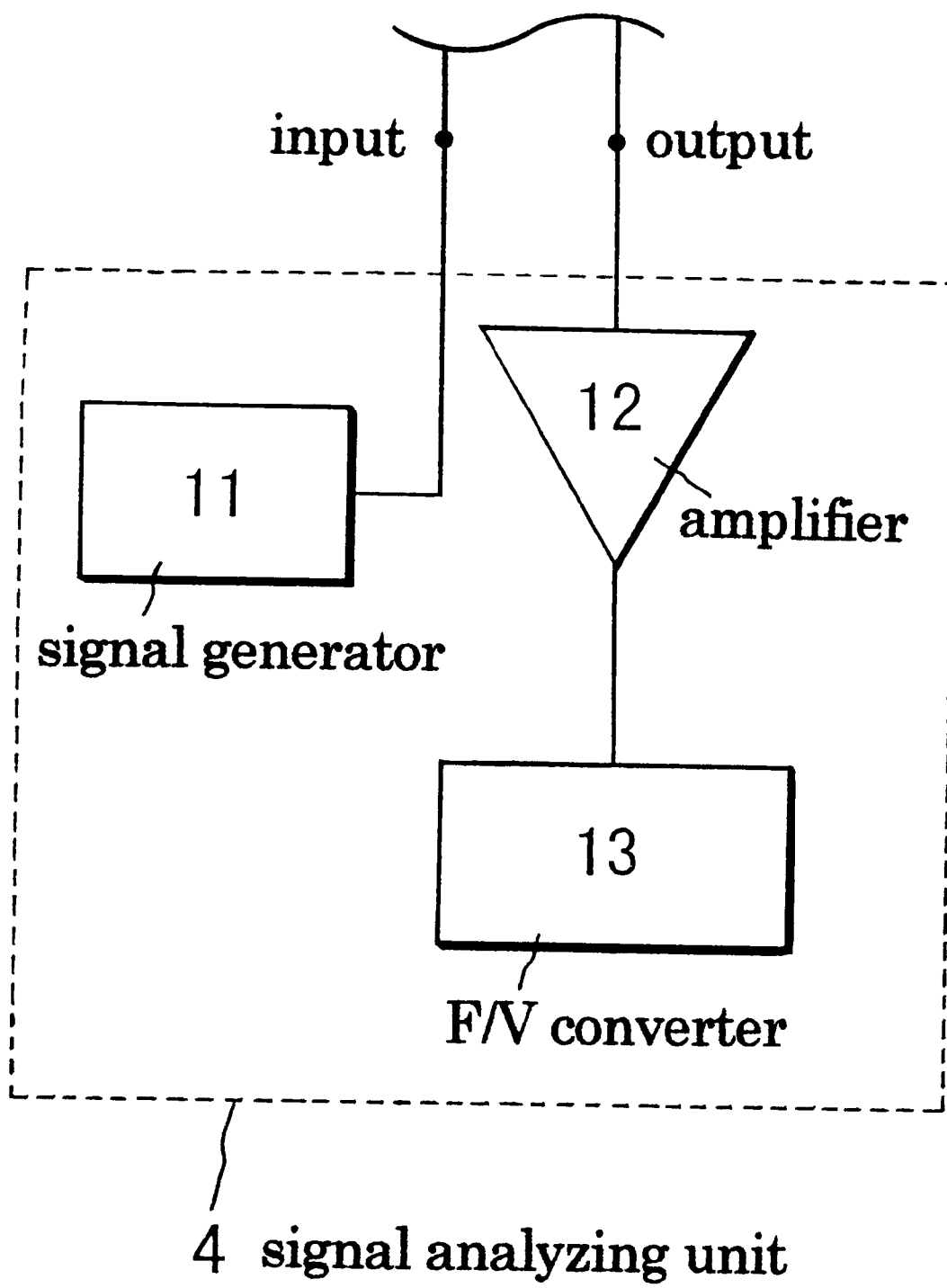
FIG. 10 shows a diagram of signal analyzing unit 4 according to a second embodiment.

FIG. 10 shows a diagram of signal analyzing unit 4 according to a second embodiment. Signal analyzing unit 4 comprises signal generator 11, amplifier 12 and frequency to voltage (F/V) converter 13.

In the ultrasonic Doppler flow-meter in FIG. 1 having signal analyzing unit 4 in FIG. 10, if an input electric signal with a carrier frequency $f_0$ is applied from signal generator 11 to input interdigital transducer 2, a leaky Labm wave is excited in substrate 1. The leaky Lamb wave is radiated in the form of a longitudinal wave into the liquid. Then, disk 6 reflects the longitudinal wave in the liquid. The reflected longitudinal wave is detected at output interdigital transducer 3 as a delayed electric signal with a Doppler frequency f. The delayed electric signal is amplified via amplifier 12. The amplified electric signal is transmitted to F/V converter 13, which converts the Doppler frequency f to a voltage thereof and detects the frequency difference $\Delta f$ in terms of the voltage converted from the Doppler frequency f.

Figure 11:
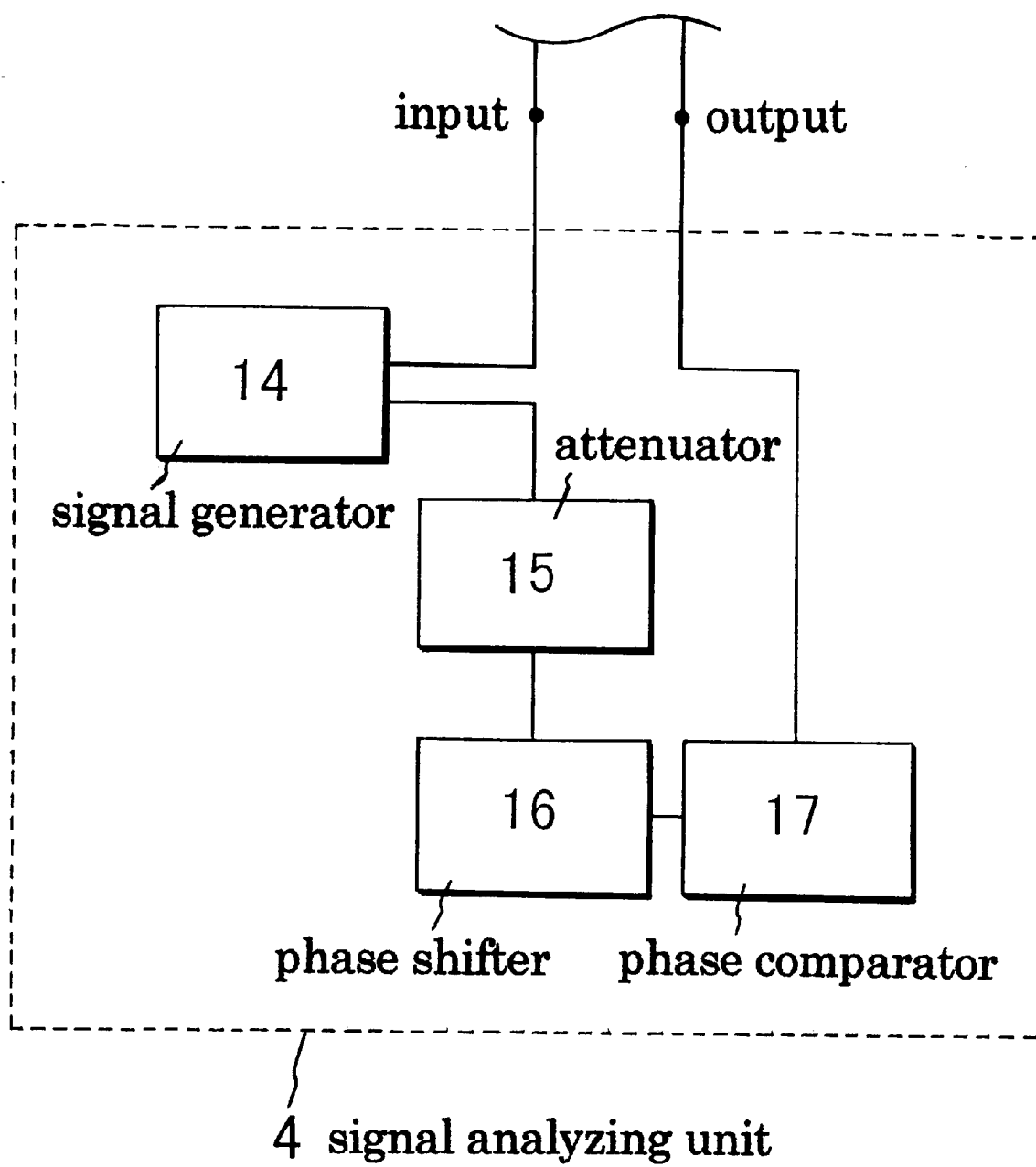
FIG. 11 shows a diagram of signal analyzing unit 4 according to a third embodiment.

FIG. 11 shows a diagram of signal analyzing unit 4 according to a third embodiment. Signal analyzing unit 4 comprises signal generator 14, attenuator 15, phase shifter 16, and phase comparator 17.

In the ultrasonic Doppler flow-meter in FIG. 1 having signal analyzing unit 4 in FIG. 11, if an input electric signal with a carrier frequency $f_0$ is applied from signal generator 14 to input interdigital transducer 2, a leaky Lamb wave is excited in substrate 1. The leaky Lamb wave is radiated in the form of a longitudinal wave into the liquid. Then, disk 6 reflects the longitudinal wave in the liquid. The reflected longitudinal wave is detected at output interdigital transducer 3 as a delayed electric signal with a Doppler frequency f. A phase of the delayed electric signal is compared with that of the input electric signal at phase comparator 17. In this time, the phase of the input electric signal attenuated via attenuator 15, in case of no rotation of disk 6, is controlled to be coincident with that of the delayed electric signal by phase shifter 16. Therefore, the phase of the input electric signal is different from that of the delayed electric signal, only when disk 6 is rotating. Thus, phase comparator 17 detects the frequency difference $\Delta f$ in terms of a phase difference between the input- and delayed electric signals.

Figure 12:
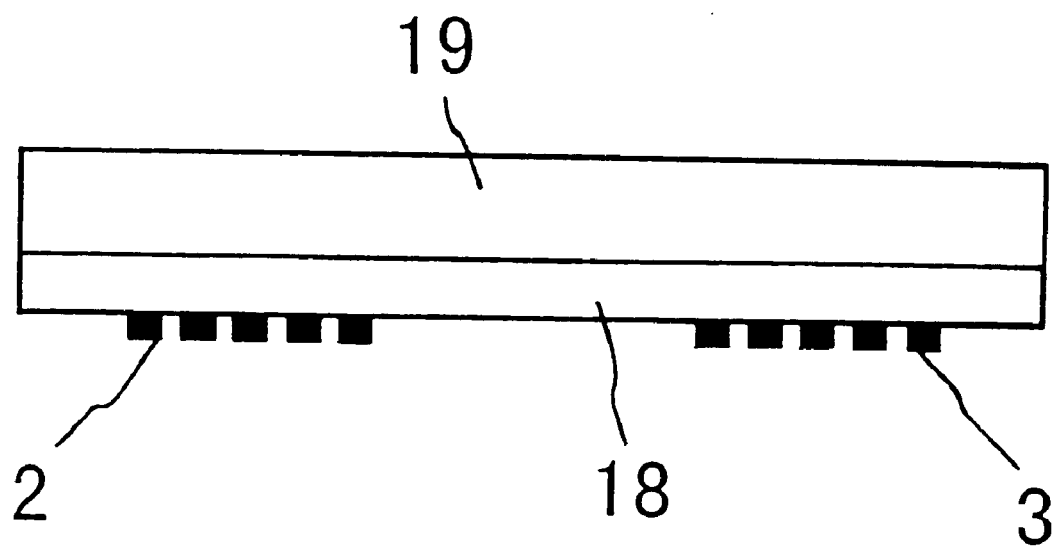
FIG. 12 shows a sectional view of another detecting assembly used in place of the detecting assembly in FIG. 2.

FIG. 12 shows a sectional view of another detecting assembly used in place of the detecting assembly in FIG. 2. The detecting assembly in FIG. 12 has the same construction as FIG. 2, except for using a double-layer body in place of substrate 1. The double-layer body consists of piezoelectric layer part 18 and nonpiezoelectric layer part 19. Each part has an inner- and an outer end surfaces. Input interdigital transducer 2 and output interdigital transducer 3 can be formed on either end surface of piezoelectric layer part 18. In this embodiment, they are formed on the outer end surface of piezoelectric layer part 18. The outer end surface of nonpiezoelectric layer part 19 is in contact with the liquid in FIG. 1. In this time, for example, an acryl plate is favorable as nonpiezoelectric layer part 19 in view of the acoustic impedance matching. The detecting assembly in FIG. 12 is superior to that in FIG. 2 in mechanical intensity of the body.

Figure 13:
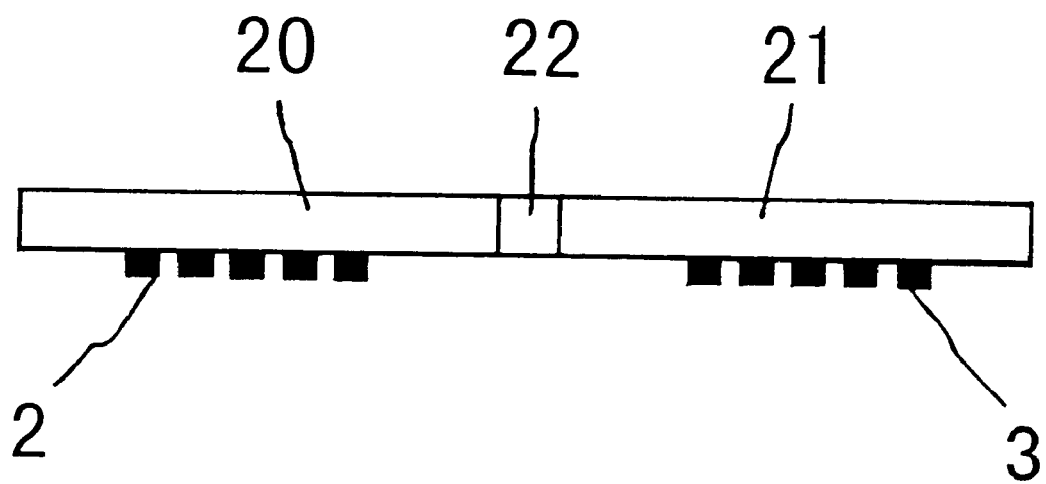
FIG. 13 shows a sectional view of another detecting assembly used in place of the detecting assembly in FIG. 2.

FIG. 13 shows a sectional view of another detecting assembly used in place of the detecting assembly in FIG. 2. The detecting assembly in FIG. 13 has the same construction as FIG. 2, except for using a triple-zone body in place of substrate 1. The triple-zone body consists of first piezoelectric zone part 20, second piezoelectric zone part 21 and nonpiezoelectric zone part 22 between first piezoelectric zone part 20 and second piezoelectric zone part 21. Each zone part has two end surfaces. Input interdigital transducer 2 and output interdigital transducer 3 are formed on one end surface of first piezoelectric zone part 20 and that of second piezoelectric zone part 21, respectively. The other end surface of each zone part being in contact with the liquid in FIG. 1. The detecting assembly in FIG. 13 is superior to that in FIG. 2 in ability of detecting the delayed electric signal at output interdigital transducer 3, because first piezoelectric zone part 20 and second piezoelectric zone part 21 are electrically separated by nonpiezoelectric zone part 22.

Figure 14:
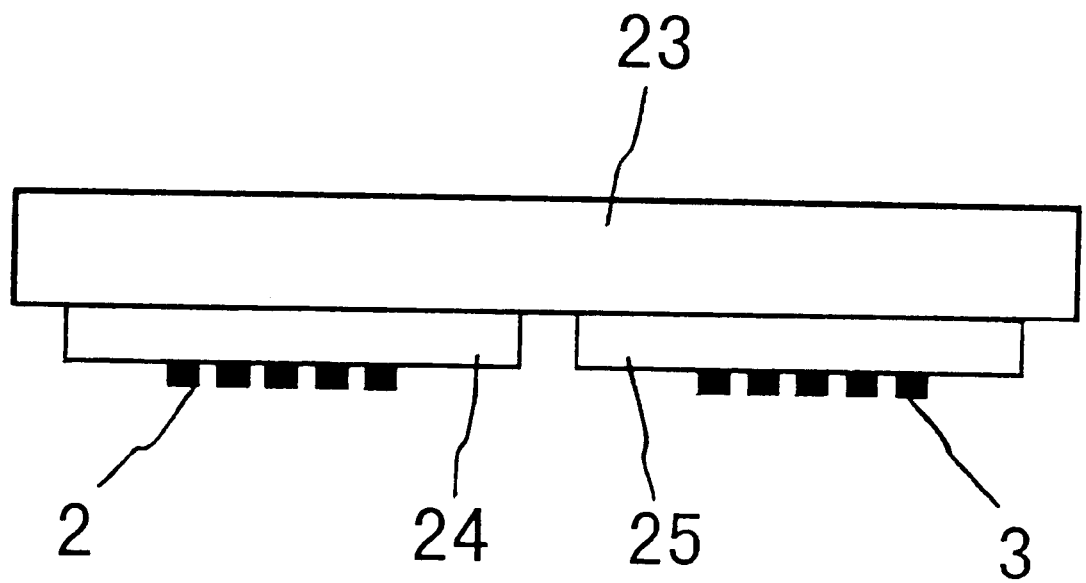
FIG. 14 shows a sectional view of other detecting assembly used in place of the detecting assembly in FIG. 2.

FIG. 14 shows a sectional view of other detecting assembly used in place of the detecting assembly in FIG. 2. The detecting assembly in FIG. 14 has the same construction as FIG. 2, except for using nonpiezoelectric plate 23, first piezoelectric substrate 24 and second piezoelectric substrate 25, in place of substrate 1. One end surface of nonpiezoelectric plate 23 is in contact with the liquid in FIG. 1. First piezoelectric substrate 24 and second piezoelectric substrate 25 are cemented with the other end surface of nonpiezoelectric plate 23 under an electrically separated condition. Input interdigital transducer 2 and output interdigital transducer 3 can be formed on either end surface of first piezoelectric substrate 24 and second piezoelectric substrate 26, respectively. The detecting assembly in FIG. 14 id superior to that in FIG. 2 in mechanical intensity and ability of detecting the delayed electric signal at output interdigital transducer 3.

Figure 15:
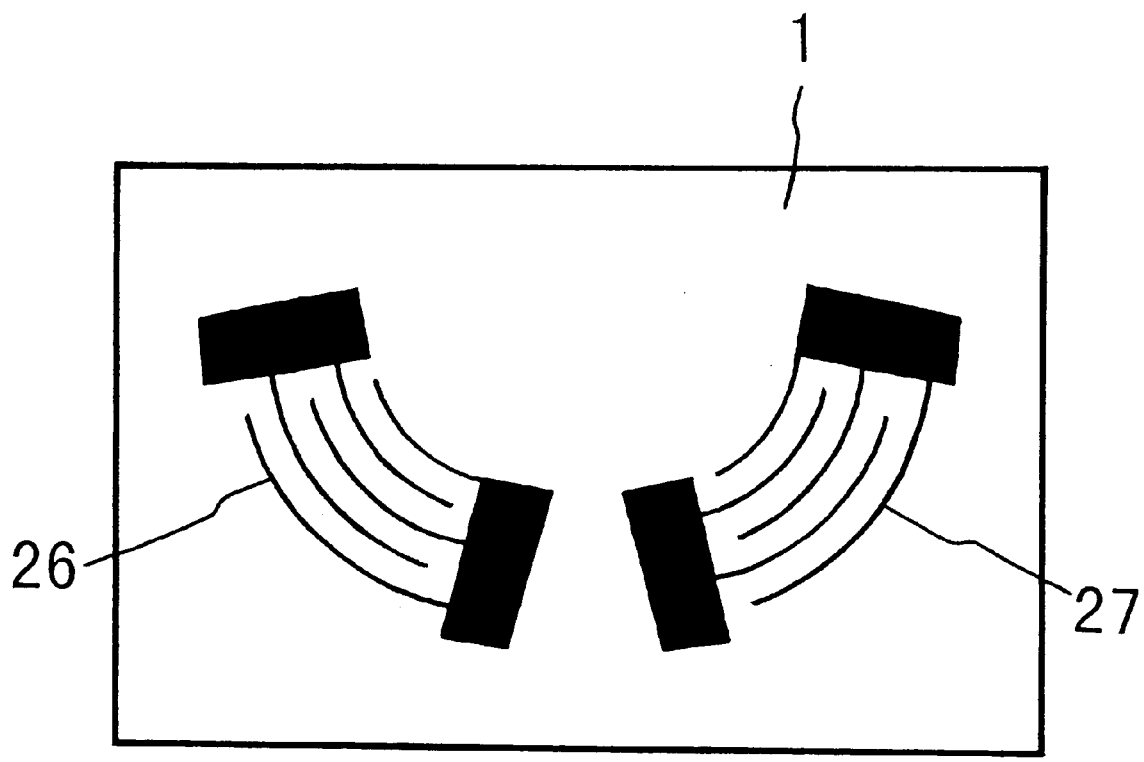
FIG. 15 shows a plan view of a further detecting assembly used in place of the detecting assembly in FIG. 2.

FIG. 15 shows a plan view of a further detecting assembly used in place of the detecting assembly in FIG. 2. The detecting assembly in FIG. 15 has the same construction as FIG. 2, except for using input interdigital transducer 26 and output interdigital transducer 27 in place of input interdigital transducer 2 and output interdigital transducer 3, respectively. Input interdigital transducer 26 and output interdigital transducer 27 have an arch-shaped electrode pattern and are made of an aluminum thin film, respectively. Input interdigital transducer 26 and output interdigital transducer 27 are arranged such that they make a pair with a concentric center. The detecting assembly in FIG. 15 is superior to that in FIG. 2 in ability of radiating the longitudinal wave in the liquid by input interdigital transducer 26 and detecting the delayed electric signal at output interdigital transducer 27, because input interdigital transducer 26 and output interdigital transducer 27 have an arch-shaped electrode pattern, respectively, and are arranged such that they make the pair with the concentric center.

In FIGS. 12, 13 and 14, it is possible to use input interdigital transducer 26 and output interdigital transducer 27 in place of input interdigital transducer 2 and output interdigital transducer 3, respectively. Such an arrangement having input interdigital transducer 26 and output interdigital transducer 27 is superior to that having input interdigital transducer 2 and output interdigital transducer 3, in a radiation ability of the longitudinal wave into the liquid and a detecting ability of the delayed electric signal.

FIG. 16 shows an illustration in case of measuring a flowing speed of a liquid in pipe 28 by using the ultrasonic Doppler flow-meter in FIG. 1. The liquid includes material 29, which moves in accordance with the flowing speed of the liquid and reflects a longitudinal wave in the liquid. In the same way as FIG. 1, the flowing speed of the liquid is obtained from the frequency difference Δf between the carrier frequency $f_0$ and the Doppler frequency f. Thus, for example, it is possible to obtain a human blood-flow speed, a flowing speed in a water pipe or a drainpipe, and so on.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An ultrasonic Doppler flow-meter comprising:
   a substrate with a piezoelectricity and made of a triple-zone body consisting of a first- and a second piezoelectric zone parts and a nonpiezoelectric zone part between said first- and second piezoelectric zone parts, each zone part having two end surfaces;
   an input interdigital transducer formed on one end surface of said first piezoelectric zone part;
   an output interdigital transducer having the same interdigital periodicity as said input interdigital transducer, and formed on one end surface of said second piezoelectric zone part not only such that said input- and output interdigital transducers are situated to be symmetrical to a line, but also such that a first intersecting line on each finger-center of the finger overlap-zone of said input interdigital transducer and a second intersecting line on each finger-center of the finger overlap-zone of said output interdigital transducer run against each other; and
   a signal analyzing unit,
      said input interdigital transducer receiving an input electric signal with a carrier frequency, exciting a leaky elastic wave in said substrate, causing a mode conversion from said leaky elastic wave to a longitudinal wave in a liquid in contact with the other end surface of each zone part, and making a material in said liquid reflect, said longitudinal waveback,
      said output interdigital transducer detecting a reflected longitudinal wave as a delayed electric signal with a Doppler frequency, said other end surface of said each zone part being perpendicular to a line passing through a reflection point at said material and a cross point of said first- and second intersecting lines,
      said signal analyzing unit sensing a moving speed of said material in terms of a frequency difference between said carrier frequency and said Doppler frequency.

2. An ultrasonic Doppler flow-meter comprising:
   a nonpiezoelectric plate, one end surface thereof being in contact with a liquid;
   a first piezoelectric substrate;
   a second piezoelectric substrate, said first- and second piezoelectric substrates being formed on the other end surface of said nonpiezoelectric plate under an electrically separated condition;
   an input interdigital transducer formed on one end surface of said first piezoelectric substrate;
   an output interdigital transducer having the same interdigital periodicity as said input interdigital transducer, and formed on one end surface of said second piezoelectric substrate not only such that said input- and output interdigital transducers are situated to be symmetrical to a line, but also such that a first intersecting line on each finger-center of the finger overlap-zone of said input interdigital transducer and a second intersecting line on each finger-center of the finger overlap-zone of said output interdigital transducer run against each other; and
   a signal analyzing unit,
      said input interdigital transducer receiving an input electric signal with a carrier frequency, exciting a leaky elastic wave in said first piezoelectric substrate, causing a mode conversion from said leaky elastic wave to a longitudinal wave in said liquid, and making a rotor in said liquid reflect said longitudinal wave back,
      said output interdigital transducer detecting a reflected longitudinal wave as a delayed electric signal with a Doppler frequency, said one end surface of said nonpiezoelectric plate being perpendicular to a line passing through a cross point of said first- and second intersecting lines and a reflection point at said rotor,
      said signal analyzing unit sensing a rotating speed of said rotor in terms of a frequency difference between said carrier frequency and said Doppler frequency.

3. An ultrasonic Doppler flow-meter comprising:
   a nonpiezoelectric plate, one end surface thereof being in contact with a liquid;
   a first piezoelectric substrate;
   a second piezoelectric substrate, said first- and second piezoelectric substrates being formed on the other end surface of said nonpiezoelectric plate under an electrically separated condition;
   an input interdigital transducer formed on one end surface of said first piezoelectric substrate;
   an output interdigital transducer having the same interdigital periodicity as said input interdigital transducer, and formed on one end surface of said second piezoelectric substrate not only such that said input- and output interdigital transducers are situated to be symmetrical to a line, but also such that a first intersecting line on each finger-center of the finger overlap-zone of said input interdigital transducer and a second intersecting line on each finger-center of the finger overlap-zone of said output interdigital transducer run against each other; and
   signal analyzing unit,
      said input interdigital transducer receiving an input electric signal with a carrier frequency, exciting a leaky elastic wave in said first piezoelectric substrate, causing a mode conversion from said leaky elastic wave to a longitudinal wave in said liquid, and making a material in said liquid reflect said longitudinal wave back, said output interdigital transducer detecting a reflected longitudinal wave as a delayed electric signal with a Doppler frequency, said one end surface of said nonpiezoelectric plate being perpendicular to a line passing through a cross point of said first- and second intersecting lines and a reflection point at said material, which is moved in accordance with a flowing speed of said liquid, said signal analyzing unit sensing said flowing speed of said material in terms of a frequency difference between said carrier frequency and said Doppler frequency.

4. An ultrasonic Doppler flow-meter comprising:

a nonpiezoelectric plate, one end surface thereof being in contact with a liquid;

a first piezoelectric substrate;

a second piezoelectric substrate said first- and piezoelectric substrates being formed on the other end surface of said nonpiezoelectric plate under an electrically separated condition;

an input interdigital transducer formed on one end surface of said first piezoelectric substrate;

an output interdigital transducer having the same interdigital periodicity as said input interdigital transducer, and formed on one end surface of said second piezoelectric substrate not only such that said input- and output interdigital transducers are situated to be symmetrical to a line, but also such that a first intersecting line on each finger-center of the finger overlap-zone of said input interdigital transducer and a second intersecting line on each finger-center of the finger overlap-zone of said output interdigital transducer are vertical to each other; and a signal analyzing unit, said input interdigital transducer receiving an input electric signal with a carrier frequency, exciting a leaky elastic wave in said first piezoelectric substrate, causing a mode conversion from said leaky elastic wave to a longitudinal wave in said liquid, and making a material in said liquid reflect said longitudinal wave back, said output interdigital transducer detecting a reflected longitudinal wave as a delayed electric signal with a Doppler frequency, said one end surface of said nonpiezoelectric plate being perpendicular to a line passing through a cross point of said first- and second intersecting lines and a reflection point at said material, said signal analyzing unit sensing a moving speed of said material in terms of a frequency difference between said carrier frequency and said Doppler frequency.

5. An ultrasonic Doppler flow-meter comprising:

a nonpiezoelectric plate, one end surface thereof being in contact with a liquid;

a first piezoelectric substrate;

a second piezoelectric substrate, said first- and second piezoelectric substrates being formed on the other end surface of said nonpiezoelectric plate under an electrically separated condition; an input interdigital transducer formed on one end surface of said first piezoelectric substrate;

an output interdigital transducer having the same interdigital periodicity as said input interdigital transducer, and formed on one end surface of said second piezoelectric substrate not only such that said input- and output interdigital transducers are situated to be symmetrical to a line, but also such that a first intersecting line on each finger-center of the finger overlap-zone of said input interdigital transducer and a second intersecting line on each finger-center of the finger overlap-zone of said output interdigital transducer run against each other; and a signal analyzing unit, said input- and output interdigital transducers having an arch-shaped electrode pattern, respectively, and making a pair with a concentric center, said input interdigital transducer receiving an input electric signal with a carrier frequency, exciting a leaky elastic wave in said first piezoelectric substrate, causing a mode conversion from said leaky elastic wave to a longitudinal wave in said liquid, and making a material in said liquid reflect said longitudinal wave back, said output interdigital transducer detecting a reflected longitudinal wave as a delayed electric signal with a Doppler frequency said one end surface of said nonpiezoelectric plate being perpendicular to a line passing through a cross point of said first- and second intersecting lines and a reflection point at said material, said signal analyzing unit sensing a moving speed of said material in terms of a frequency difference between said carrier frequency and said Doppler frequency.

* * * * *